(12) United States Patent
Williams et al.

(10) Patent No.: US 8,724,521 B2
(45) Date of Patent: May 13, 2014

(54) SYSTEMS AND METHODS OF RECORDING SOLUTION INTERFACE

(75) Inventors: Jamie Richard Williams, Fleet (GB); Kenneth Richard Brodhagen, Roswell, GA (US)

(73) Assignee: Verint Americas Inc., Alpharetta, GA (US)

( * ) Notice: Subject to any disclaimer, the term of this patent is extended or adjusted under 35 U.S.C. 154(b) by 1005 days.

(21) Appl. No.: 12/118,792

(22) Filed: May 12, 2008

(65) Prior Publication Data

US 2009/0034436 A1    Feb. 5, 2009

Related U.S. Application Data

(60) Provisional application No. 60/952,675, filed on Jul. 30, 2007.

(51) Int. Cl.
*H04L 12/16*    (2006.01)

(52) U.S. Cl.
USPC ........................... 370/259; 370/352

(58) Field of Classification Search
USPC ............... 379/221.08, 88.22, 265.11, 67.1; 709/318, 224, 204, 218, 246; 370/352, 370/252, 217, 429, 463, 437; 381/315; 348/247; 714/763, 811, 47.1; 715/509
See application file for complete search history.

(56) References Cited

U.S. PATENT DOCUMENTS

| | | | |
|---|---|---|---|
| 5,946,375 A | 8/1999 | Pattison et al. | |
| 6,731,625 B1 * | 5/2004 | Eastep et al. | 370/352 |
| 6,795,868 B1 * | 9/2004 | Dingman et al. | 709/246 |
| 6,917,625 B1 * | 7/2005 | Brush et al. | 370/437 |
| 7,023,979 B1 * | 4/2006 | Wu et al. | 379/265.11 |
| 7,027,463 B2 * | 4/2006 | Mathew et al. | 370/463 |
| 7,092,506 B1 | 8/2006 | Bers et al. | |
| 7,155,641 B2 * | 12/2006 | Prang et al. | 714/47.1 |
| 7,254,109 B2 * | 8/2007 | Verma et al. | 370/217 |
| 7,286,652 B1 * | 10/2007 | Azriel et al. | 379/88.22 |
| RE41,608 E * | 8/2010 | Blair et al. | 379/67.1 |
| 8,132,089 B1 * | 3/2012 | Blair | 714/811 |
| RE43,324 E * | 4/2012 | Blair et al. | 379/67.1 |
| 2001/0033644 A1 * | 10/2001 | Offer | 379/221.08 |
| 2002/0064149 A1 * | 5/2002 | Elliott et al. | 370/352 |
| 2003/0105884 A1 * | 6/2003 | Upton | 709/318 |
| 2004/0208165 A1 * | 10/2004 | Cai et al. | 370/352 |
| 2005/0058313 A1 * | 3/2005 | Victorian et al. | 381/315 |

(Continued)

FOREIGN PATENT DOCUMENTS

| | | | | |
|---|---|---|---|---|
| EP | 627684 A2 | * | 12/1994 | G06F 9/44 |
| JP | 01160247 A | * | 6/1989 | H04M 3/42 |
| KR | 2005070722 | * | 7/2007 | |

OTHER PUBLICATIONS

RD 416021A, Dec. 1998.*

(Continued)

*Primary Examiner* — Asad Nawaz
*Assistant Examiner* — Parth Patel
(74) *Attorney, Agent, or Firm* — Meunier Carlin & Curfman

(57) ABSTRACT

Included are embodiments for providing an interface. At least one embodiment of a method includes receiving communications data associated with a communications session, the communications session facilitated in an Internet Protocol environment and providing an interface for facilitating recording of at least a portion of the communications session, the interface being facilitated in an Internet Protocol format.

21 Claims, 8 Drawing Sheets

(56) References Cited

U.S. PATENT DOCUMENTS

| | | | |
|---|---|---|---|
| 2005/0198281 A1* | 9/2005 | Wang et al. | 709/224 |
| 2005/0231617 A1* | 10/2005 | Kitani | 348/247 |
| 2005/0246612 A1* | 11/2005 | Leis et al. | 714/763 |
| 2006/0045067 A1* | 3/2006 | Dezonno et al. | 370/352 |
| 2006/0087555 A1 | 4/2006 | Boyd et al. | |
| 2006/0150078 A1* | 7/2006 | Brookler et al. | 715/509 |
| 2006/0168111 A1* | 7/2006 | Gidwani | 709/218 |
| 2007/0041330 A1* | 2/2007 | Bostica et al. | 370/252 |
| 2007/0143398 A1* | 6/2007 | Graham | 709/204 |
| 2007/0171898 A1 | 7/2007 | Salva | |
| 2007/0201502 A1* | 8/2007 | Abramson | 370/429 |
| 2007/0230345 A1* | 10/2007 | Spohrer et al. | 370/235 |
| 2008/0063167 A1 | 3/2008 | Rao et al. | |
| 2008/0219243 A1* | 9/2008 | Silverman | 370/352 |
| 2008/0253363 A1* | 10/2008 | Altberg et al. | 370/352 |
| 2009/0016522 A1 | 1/2009 | Torres et al. | |

OTHER PUBLICATIONS

U.S. Official Action, dated Jan. 17, 2013, issued in connection with related U.S. Appl. No. 13/252,986.

* cited by examiner

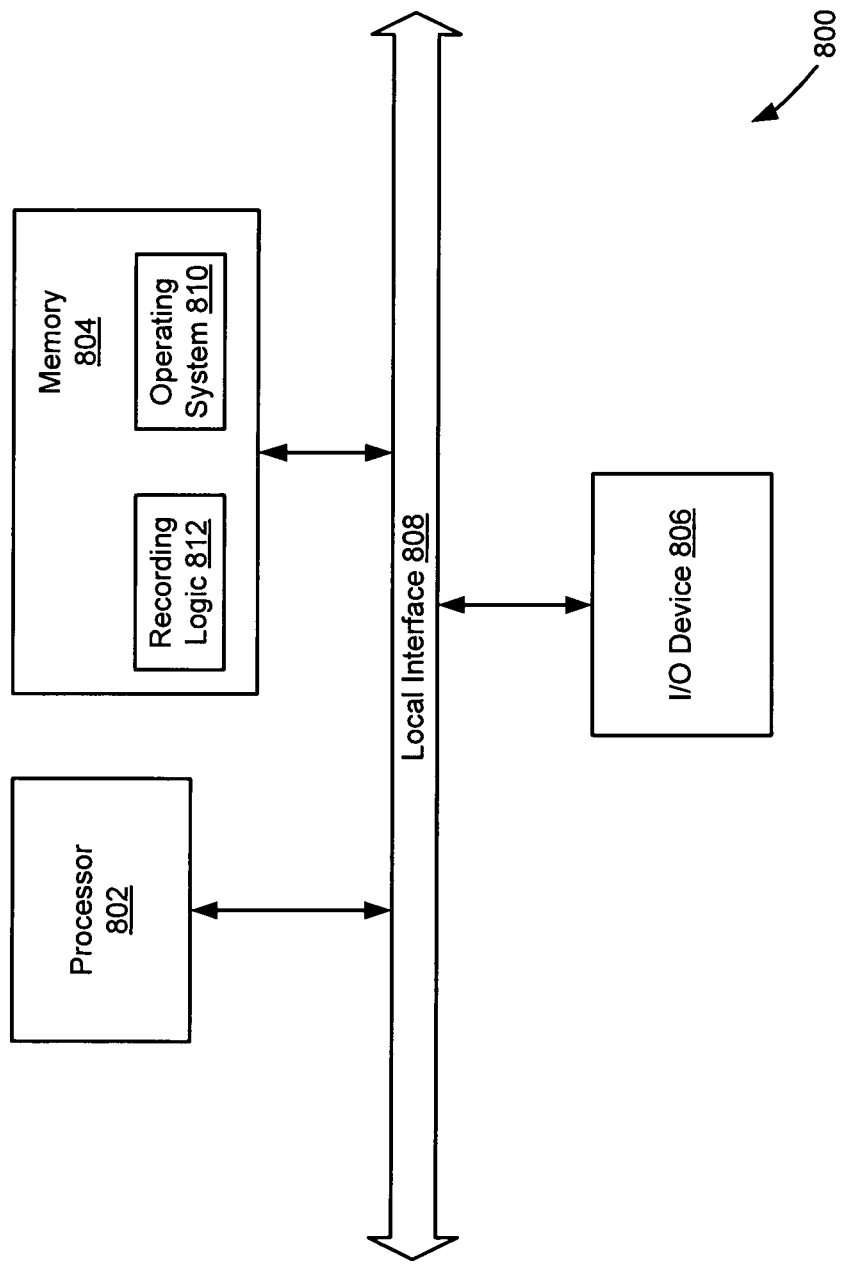

SYSTEMS AND METHODS OF RECORDING SOLUTION INTERFACE

CROSS-REFERENCE TO RELATED APPLICATION

This application claims priority to U.S. Patent Application No. 60/952,675, filed Jul. 30, 2007, entitled "SYSTEMS AND METHODS RECORDING SOLUTION INTERFACE," which is incorporated by reference in its entirety.

TECHNICAL FIELD

This application relates to recording solutions. More specifically, this application relates to recording solutions in a communications network.

BACKGROUND

Customer centers may record communications among employees and between employees and customers to monitor quality of performance, determine customer requests, and/or for other reasons. Some customer centers include recording components used for such recordings that are specific to certain types of communications, such as time division multiplexing (TDM) and Internet Protocol (IP). For example, a customer center that records TDM audio may include a TDM recorder. If that customer center records both TDM and IP communications data, the customer center also may also have an IP recorder that is separate and independent from the TDM recorder.

In addition, if a customer center is configured to record agent desktop screen data, the customer center may utilize a screen capture recorder, which may be separate and independent from the TDM and IP recorders. In addition, some customer centers have both TDM and IP infrastructures associated with recording communications at the customer centers. However, there are various communications protocols available that can be implemented in both the TDM and IP infrastructures. If the customer centers change communications protocols, the customer centers may utilize different recording-related components associated with the changed protocol to implement the change, which may be expensive and time consuming. Additionally, oftentimes, customer centers desire an interface to facilitate recording of the communications data and/or the ability to change settings of the recording infrastructure.

SUMMARY

Included are embodiments for providing an interface. At least one embodiment of a method includes receiving communications data associated with a communications session, the communications session facilitated in an Internet Protocol environment and providing an interface for facilitating recording of at least a portion of the communications session, the interface being facilitated in an Internet Protocol format.

Also included are embodiments of a system for providing an interface. At least one embodiment includes a receiving component configured to receive communications data associated with a communications session, the communications session facilitated in an Internet Protocol environment and a providing component configured to provide an Internet Protocol voice interface for facilitating recording of at least a portion of the communications session, the interface being facilitated in an Internet Protocol format. Some embodiments include a recording component configured to record at least a portion of the communications data according to the interface.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 8 is an exemplary embodiment illustrating a computer for implementing an interface.

DETAILED DESCRIPTION

Disclosed herein are systems and methods for capturing communications data at a customer center and/or providing an IP voice interface. In particular, embodiments disclosed herein incorporate recording techniques that include at least one interface library that facilitates receiving and recording of communications data. The recording techniques can be deployed at a centralized location, e.g., within a company premises, and/or embedded into a network as a service on the network and/or as intelligence in the network infrastructure.

Exemplary embodiments are first discussed with reference to the figures. Although these embodiments are described in detail, they are provided for purposes of illustration only and various modifications are feasible.

Figure 1:
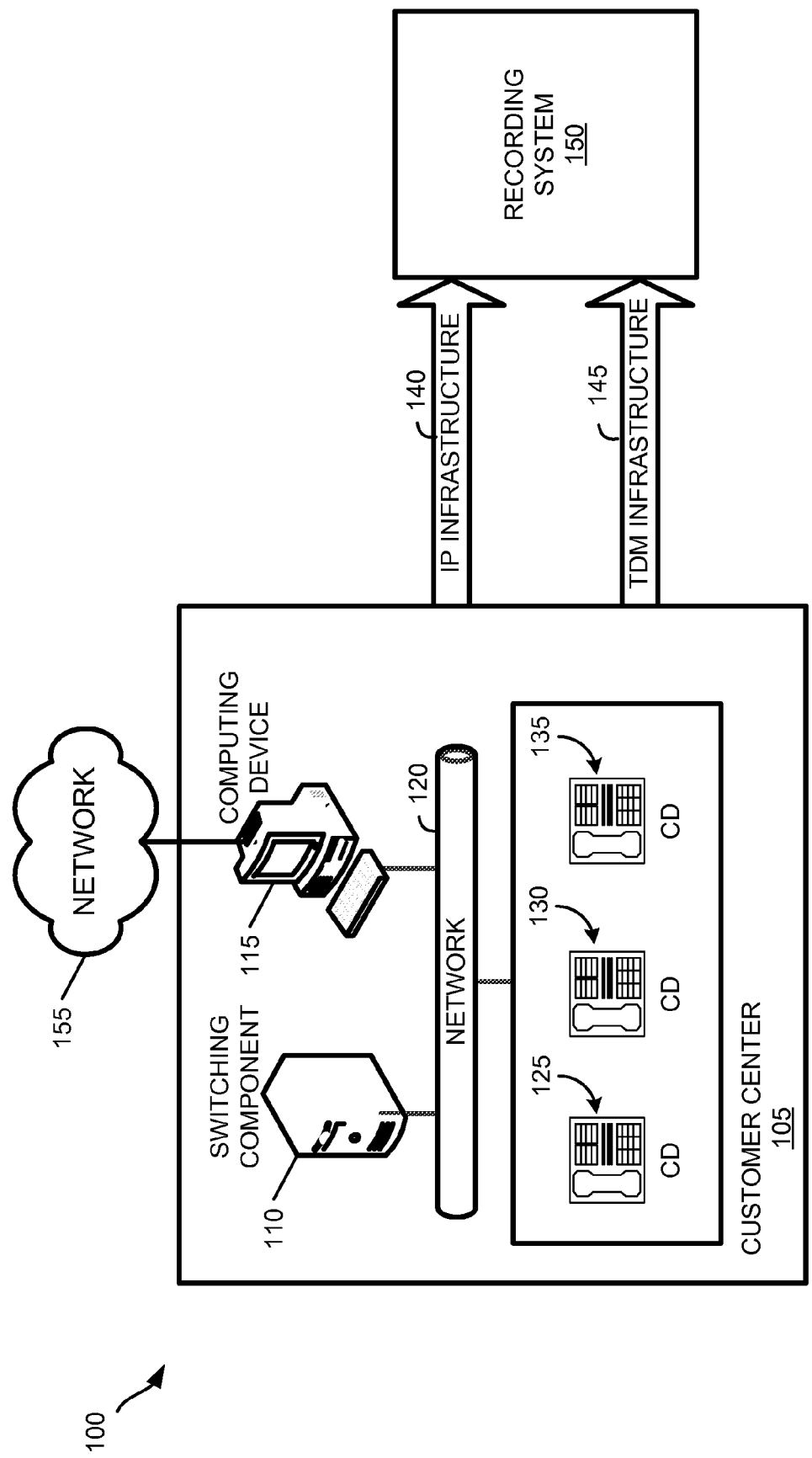
FIG. 1 is a schematic diagram of an embodiment of a system in which communications at a customer center can be recorded by a recording system.

FIG. 1 is a schematic diagram of an embodiment of a system 100 in which communications at a customer center can be recorded by a recording system 150. As indicated in the nonlimiting example of FIG. 1, the system 100 may include a customer center premises 105 that includes a customer center switching component 110, computing device 115, and communications devices 125, 130, 135, which may be communicatively connected to a customer center network 120. The communications devices 125, 130, 135 may include, but are not limited to, turret communications devices, soft communications devices and Internet Protocol (IP) communications devices, etc.

Incoming communications from a communications network 155 can be routed to the switching component 110, which can route the communications to the computing device 115 and/or communications devices 125, 130, 135. The communication network 155 can be a Public Switch Telephony Network (PSTN) and/or IP-based network, among others. The incoming communications can include, but are not limited to, voice, text, video, and/or data, among others. The customer center network 120 can include, but is not limited to, a wide area network (WAN), a local area network (LAN), a virtual private network (VPN) and/or the Internet.

The switching component 110 may be operative to process the communications at the customer center 105 and transmit the communications to a recording system 150 via, for example, an IP infrastructure 140 and/or a TDM infrastructure 145, among others. The customer center 105 is further described in relation to FIG. 2.

The IP infrastructure 140 of the customer center 105 can include, but is not limited to, a Pseudowire Emulation Edge to Edge (PWE3) protocol, Session Initiation Protocol (SIP), and Real-Time Transport Protocol (RTP), among others. The objective of PWE3 protocol is to support many Layer 1 and Layer 2 services over a common packet switched network (PSN) infrastructure. The Layer 1 and Layer 2 services include, but are not limited to, frame relay, Ethernet, Asynchronous Transfer Mode (ATM), Synchronous Optical Network (SONET), and Time Division Multiplexing (TDM). The PWE3 protocol defines framework and architecture with particular requirements to satisfy the service-specific protocol that defines how each Layer 1 or Layer 2 is encapsulated in PSN frames. Examples of PSN include, but are not limited to, MultiProtocol Label Switching (MPLS), Internet Protocol (IP) such as RTP, IPv4, or IPv6, and Layer 2 Tunneling Protocol (L2TP). The PWE 3 protocol also defines control protocol to establish connectivity across the PSN.

TDM infrastructure 145 includes a circuit mode communication with a fixed number of channels and constant bandwidth per channel. In circuit switched networks, such as the Public Switched Telephone Network (PSTN), among others, multiple subscribers' calls may be transmitted along the same transmission medium. To accomplish this, network designers make use of TDM. TDM allows switches to create channels, also known as tributaries, within a transmission stream. A standard voice signal generally has a data bit rate of 64 kbit/s, determined using Nyquist's Sampling Criterion. TDM takes frames of the voice signals and multiplexes them into a TDM frame, which runs at a higher bandwidth.

Figure 2:
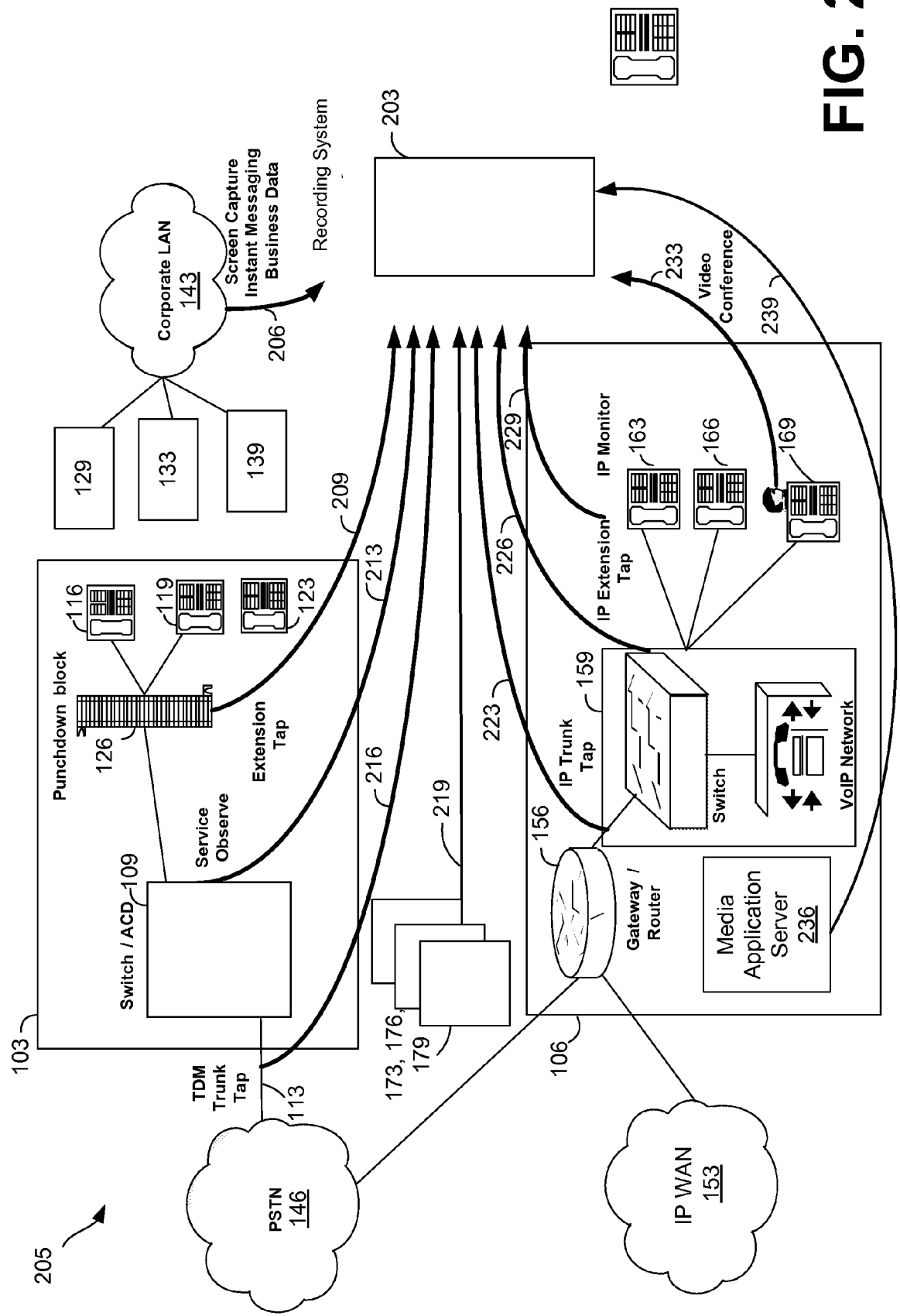
FIG. 2 is a schematic diagram of an embodiment of a communications network at a customer center, such as that shown in FIG. 1.

FIG. 2 is a schematic diagram of an embodiment of a communications network at a customer center 205. The customer center 205 includes a telephony system 103 and a Voice over IP (VoIP) system 106. The telephony system 103 may be configured to receive communications data by way of a switch 109 (or automatic call distributor "ACD") via line 113. The switch 109 can distribute incoming communications data to one or more communications devices 116, 119, 123 via a punchdown block 126. The communications devices 116, 119, 123 may be coupled to desktops 129, 133, 139 that communicate with the communications devices 116, 119, 123. In addition, the desktops 129, 133, 139 can be coupled to a corporate LAN 143, which enables the desktops to communicate with each other and/or with other computers outside the customer center 205. The telephony system 103 may be coupled to a PSTN 146 and can transmit outgoing communications data using the PSTN 146.

The Voice over Internet Protocol (VoIP) system 106 can be connected to the PSTN 146. The VoIP system 106 may be configured to receive and transmit communications data via gateway/router 156. If the gateway 156 receives the communications data from the PSTN 146, the gateway 156 converts the communications data to digital communications data. Similarly, the gateway 156 can receive digital communications data from an Internet Protocol Wide Area Network (IP WAN) 153. In either or both situations, the gateway 156 may be configured to send the digital communications data to a VoIP network/switch 159, which distributes the signal to VoIP communications devices 163, 166, 169.

A recording system 203 can be a single recording server or a cluster of recording servers, for example. The recording system 203 can receive various types of communication signals from the communication network and store the communication signals in an allocated resource (not shown). The recording system 203 can receive and store, for example, data 206 from the agent desktops 129, 133, 139, such as screen capture, instant message, and business data through the corporate LAN 143; audio data 209 from the punchdown block 126 by way of extension taps; service observation data 213 from the switch/ACD 109; communications data 216 between the switch 109 and PSTN 146 by way of TDM trunck taps; IP data 223 between the gateway 156 and the VoIP Network/switch 159 by way of IP trunk taps; IP data 226 from the switch by way of IP extension taps; IP data 229 from IP communications devices 163, 166 by way of IP monitoring, media data 239 from the media application server 236, and video conference data 233 from the IP communications device 169. Similarly, the recording system 203 can receive and store communication signals in either 32-bit or 128-bit scheme, or both.

The recording system 203 can further receive various types of external contact center events 219 from the multiple servers 173, 176, 179. The recording system 203 enables continued use of the multiple servers 173, 176, 179 by receiving the various types of external contact center events 219 and determines whether to record communications data based on the received events. Similarly, the recording system 203 can receive and store data from media servers with recorder capabilities ("media server/recorder"). The recording system 203 may include one or more interfaces that communicate with the media servers/recorder to manage the data stored in the media server/recorder, such as archive, data management, and search and mine. In other words, the recording system 203 can integrate with the media server/recorder as a cluster of subsystems. Additionally or alternatively, the recording system 203 receives and stores data stored in the media server/recorder.

Figure 3:
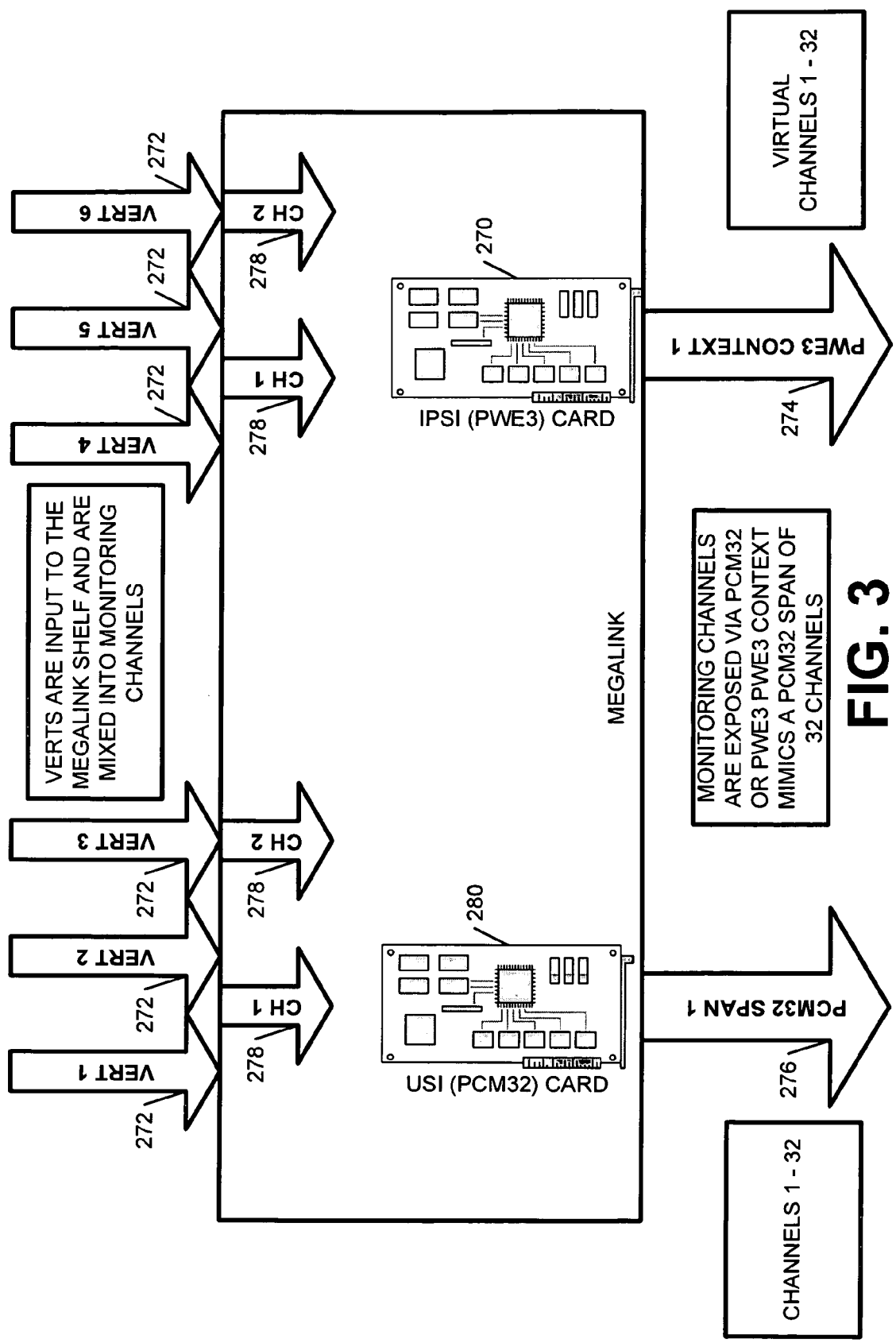
FIG. 3 is an exemplary embodiment of a megalink, illustrating components that may be utilized for recording in a communications network, which may include the customer center from FIG. 1.

FIG. 3 is an exemplary embodiment of a megalink, illustrating components that may be utilized for recording in a communications network, which may include the customer center 105 from FIG. 1. As illustrated in the nonlimiting example of FIG. 3, one or more Internet Protocol Switch Interface (IPSI) cards 270 may be utilized to connect to one or more recorders (not shown in this nonlimiting example). The IPSI cards 270 may or may not be connected to IP turrets and/or other communications devices, as well. Similar to a TDM configuration, the verts (verticals) 272 of the trading system may be mixed and organized into one or more contexts 274. A context 274 may be similar to a single Pulse Code Modulation 32 (PCM32) span 276, which may be provided by a Universal Switch Interface (USI) PCM32 card 280. So each context may include up to 32 multiplexed channels 278 on it. FIG. 3 illustrates how the IPSI Cards 270 are similar to the USI (PCM32) Cards 280 in that they may both be configured to transmit a mixed set of Verts 272 over a wire protocol.

Figure 4:
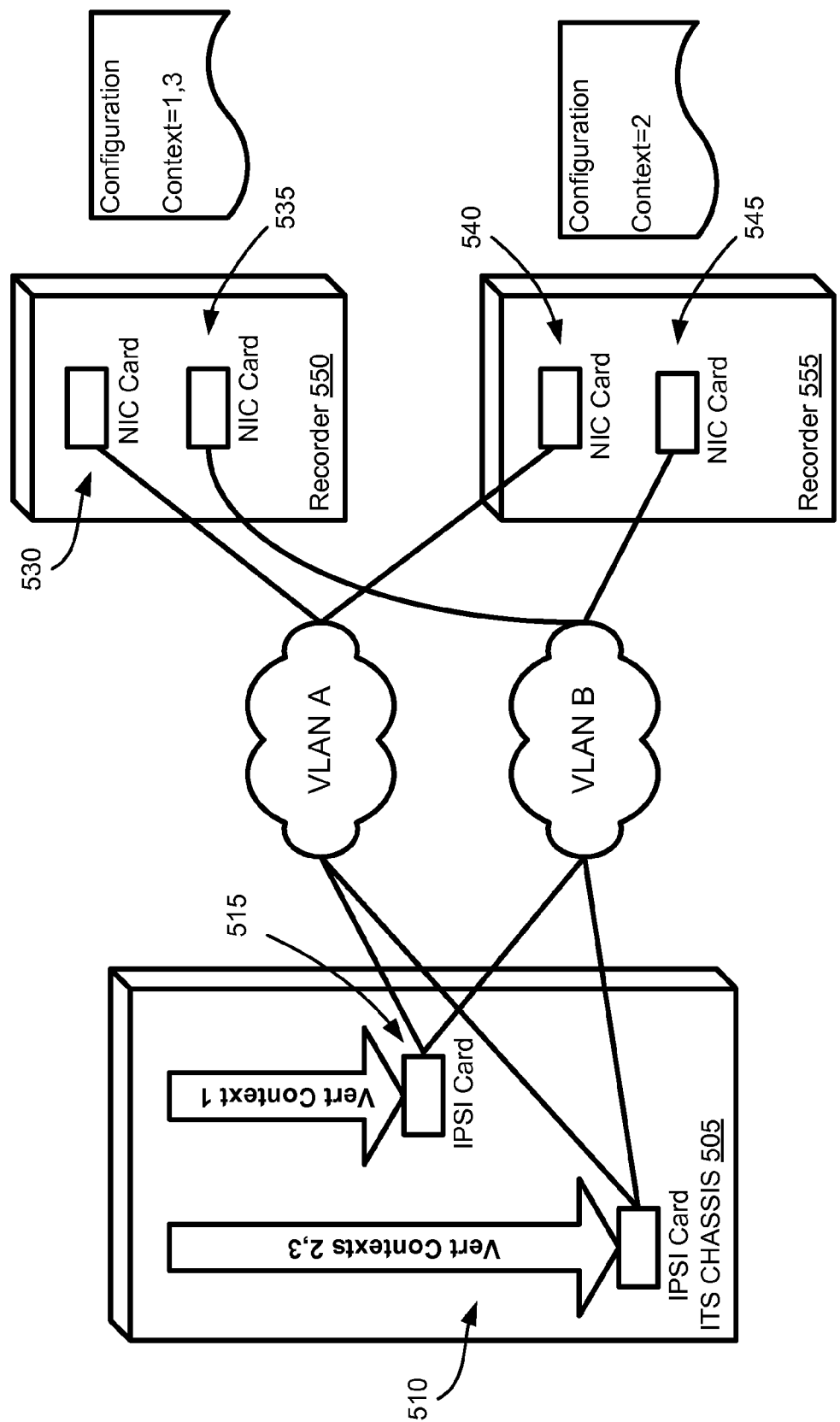
FIG. 4 is an exemplary embodiment illustrating a plurality recorders coupled to an Internet Protocol Switch Interface (IPSI) card, such as the IPSI card from FIG. 3.

FIG. 4 is an exemplary embodiment of a network configuration illustrating a plurality of IPSI cards 510, 515 located in Integrated Trading System (ITS) chassis 505, may be coupled to a plurality of recorders 535, 545 at adapters 530, 535, 540, and 545. More specifically, a single IPSI card 510, 515 may have one or more contexts it serves. Similarly, a trading system may have one or more IPSI cards 510, 515 that are designated for providing data to recorders 550, 555.

Figure 5:
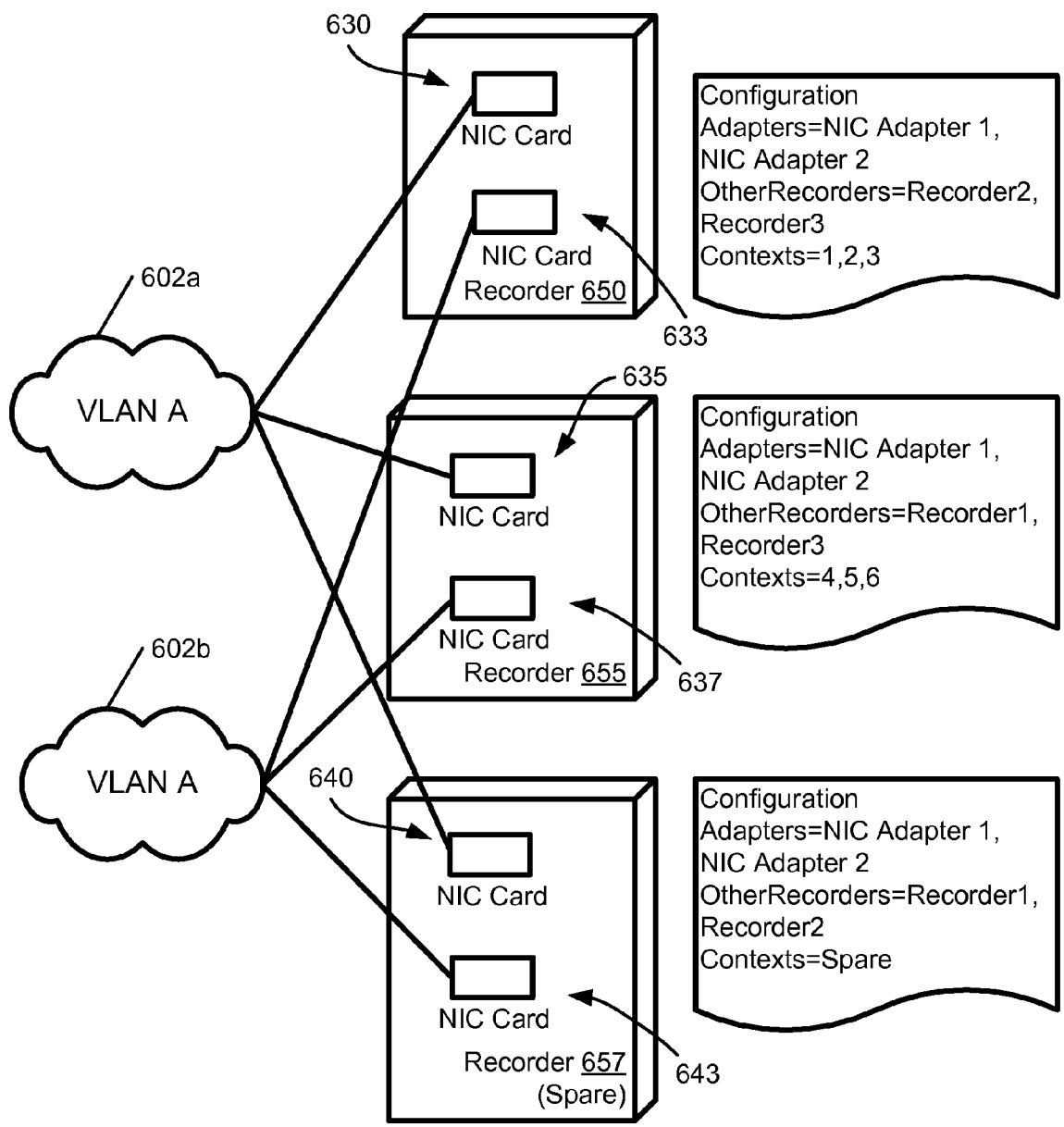
FIG. 5 is an exemplary embodiment illustrating a plurality of recorders coupled to a plurality of networks, similar to the diagram from FIG. 4.

Each recorder 550, 555 may be configured to determine which contexts to record. This is similar to instructions indicated which PCM32 spans that recorder is associated. The IP Voice Interface (such as may be provided by recording logic 812 from FIG. 8) may determine which contexts to connect the recorders 550, 555 for determining with which IPSI cards 510, 515 to communicate. In FIG. 5, the recorders can record from any of three contexts, via two IPSI Cards, and two Recorders. Recorder 550 may be configured to record Contexts 1 and 3. Recorder 2 is configured to record context 2. Further, some embodiments may be configured to remove silent periods in a communication to minimize the resources required to store a recorded communication. Protocols such as VOX detect may be utilized.

FIG. 5 is an exemplary embodiment illustrating a plurality of recorders coupled to a plurality of networks, similar to the diagram from FIG. 4. As illustrated in the nonlimiting example, Virtual Local Area Networks (VLANs) 602a, 602b may be coupled to a plurality of recorders 650, 655, 657. The recorder 650 may include Network Interface Card (NIC) adapters 630, 633, which may be coupled to VLANs 602a and 602b, respectively. Similarly, NIC adapters 635, 637 may be coupled to VLANs 602a and 602b, respectively. NIC adapters 640, 643 may be coupled to VLANs 602a, 602b, respectively.

As illustrated, the recorder 650 may be configured to record data from contexts 1, 2, and 3. The recorder 655 may be configured to record data from contexts 4, 5, and 6. The recorder 657 may be configured to record data as a spare recorder to provide failover protection for the recorders 650 and 655. Similarly, while in some embodiments, the recorder 657 may be configured to refrain from normal operation until receiving a signal that a recorder 650, 655 is unable (and/or inefficient) to record, this is a nonlimiting example. More specifically, in at least one exemplary embodiment, the recorders 650, 655, 657 may each be designated to one or more contexts for recording. Upon failure (and/or other lack of full operability) of a recorder, the contexts related to the failed recorder may be automatically redistributed to the remaining recorders. When the failed recorder is restored (and/or replaced), the contexts may be redistributed to the restored recorder.

Figure 6:
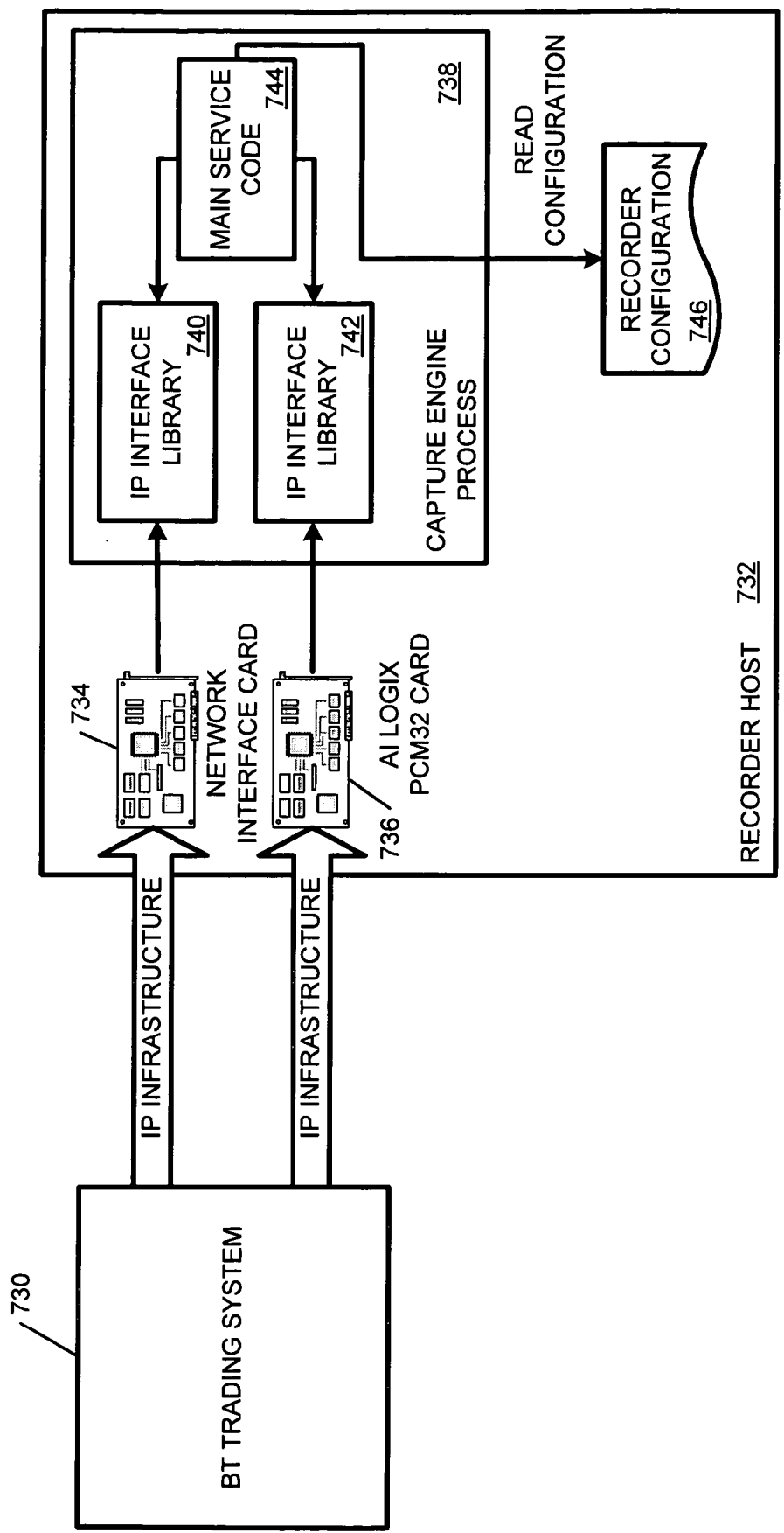
FIG. 6 is an exemplary embodiment illustrating a customer center and a recorder host, which may be configured to provide an IP voice interface, similar to the diagram from FIG. 5.

FIG. 6 is an exemplary embodiment illustrating a customer center 730 and a recorder host 732, similar to the diagram from FIG. 5. As illustrated in the nonlimiting example of FIG. 6, the customer center 730 (which may include a British Telecom trading system and/or other customer center) may be configured to send IP infrastructure and/or other data to the recorder 732, which may include a network interface card 734 and an AI Logix PCM32 card 736. The network interface card 734 may be configured to send data to a capture engine process block 738, which may include an IP interface library 740. Similarly, the PCM32 card 736 may be configured to send data to the capture engine process block 738, which may also include an IP interface library 742. The IP interface libraries 740, 742 may be configured to send and/or receive data from main service code 744. The main service code 744 may be configured to create a recorder configuration document 746.

More specifically, in operation, the IP Voice Interface Library 740, 742 represents code developed by a hardware vendor to interface with an IP voice infrastructure. Similarly, the main service code 744 represents a capture engine code that loads the IP Voice interface library 740, 742 and uses the loaded data to obtain the voice data.

The IP voice interface library 740 may be configured to encapsulate the wire-protocol for IP voice transmission (PWE3, etc.). The IP voice interface library 470 may also be configured to use configuration information supplied by the main service code 744. The IP voice interface library 740 may also be configured to signal the main service code 744 via a callback when voice data is available.

Similarly, the main service code 744 may be configured to load configuration information from the recorder 732 and configure the IP voice interface library 740 with that information. Additionally, depending on the particular exemplary embodiment, the main service code 744 may be configured to respond to available voice data by copying the data into a buffer (not shown) and processing. The main service code 744 may also be configured to respond to loss of a connection to the IP Voice infrastructure by signaling to standby recorders. The main service code 744 may be configured to communicate with other recorders to determine whether a standby recorder should take over recording duties.

In at least one exemplary embodiment, the IP voice interface may be a 32-bit Windows Dynamic Link Library (DLL) exposing a specified set of API functions. More specifically, the IP voice interface may be configured to provide an event callback interface and/or initialization/termination functionality. The event callback interface may be the primary interface used during recording. This interface may be configured to deliver voice packets and/or error, warning and status information for a recording.

With regard to the event/callback functionality, the IP voice interface may be configured to define the following callback API: void EventCallback (int channel, int eventCount, EventType[ ] event, void*parameter);

TABLE 1

Event/Callback Functionality

| Parameter | Description |
|---|---|
| Channel | Indicates the virtual channel on which the event is appearing. This may be a mixed set of verts similar to a PCM32 channel. |
| EventCount | The number of events pointed to by event. This allows a multiple number of events to be delivered in the same callback to optimize performance. |
| Event | Array of events to be processed by the callback. |
| Parameter | A parameter defined by the client library. Separate values can be defined for each channel. This might be, for example, a pointer to an object containing state information for the channel. |

An event structure may be utilized with the IP voice interface and may be configured to define at least one event type.

More specifically, in at least one exemplary embodiment, the event structure may be represented as the following computer code:

TABLE 2

Event Structure

```
struct Event
{
int eventType;
long parameter1;
long parameter2;
};
```

| Field | Description |
|---|---|
| EventType | Enumeration of event types. |
| Parameter1 | Event-specific parameter for the event. |
| Parameter2 | Event-specific parameter for the event. |

Additionally, event types, such as from Table 2, which may be provided in the IP voice interface, may be represented by the following:

TABLE 3

Event Types

| Event Type | Description |
|---|---|
| EVENT_BUFFER_READY | Indicates a buffer of voice data is ready for the client to gather and process. Parameter 1 contains the number of bytes available. |
| EVENT_WARNING_PARTIAL_CONNECTION_LOSS | Indicates one of the redundant connections is lost, but not all of them. Provided to allow the client to execute alarm operations. The context lost is identified by parameter 1. The network interface lost is identified by parameter 2. This event may trigger after a Start Streaming API is called and after the implantation can determine that a connection is not available for a particular context. |
| EVENT_ERROR_CONNECTION_LOST | Indicates all of the redundant connections are lost. The context lost is identified by parameter 1. This event will fire after the Start Streaming API is called as soon as the implantation can determine that a connection is not available for a particular context. |
| EVENT_ERROR_OVERFLOW | Indicates at least some voice data was lost because the client was not able to gather it before the buffer overlflowed. |

A RegisterCallback function may also be utilized and may be called by a client API to register a callback function for a given channel. A different callback function can be registered for each channel and each channel can be registered with a different client-definable parameter. Additionally, the following code may be utilized to represent the registercallback function:

void RegisterCallback(int channel, CallbackFunctionType callback, void*parameter);

TABLE 4

| RegisterCallback function | |
|---|---|
| Parameter | Description |
| Channel | Identifies the virtual channel for which the callback function will be called. Can be 1 or 0 to indicate all channels. |
| Callback | Pointer to the callback function to be called for the specified channel. |
| Parameter | Pointer to client-definable data for the specified channel. May be passed back when the callback function is called. |

The GetBuffer function may also be utilized by the IP voice interface and may is called by the client API to gather voice data when it is available for processing. This function may be represented by the following code:

long GetBuffer(int channel, char*buffer, long bufferSize);

TABLE 5

GetBuffer function

| Parameter | Description |
|---|---|
| Channel | Indicates the virtual channel to obtain data from. |
| Buffer | Pointer to buffer to place data in. |
| BufferSize | Size of buffer available to place data in. |
| Return Value | Number of bytes placed in the buffer by the interface. |

Additionally, the IP voice interface may utilize Initialization/Termination functions, which may be configured to initialize and terminate functionality inside the interface library. They may be available for the interface library to setup and tear down any necessary resources for use. It may be possible to initialize and shutdown the library any number of times during the same process. Similarly, it may also be possible to initialize the library any number of times without interrupting any functionality. The implementation may be configured to count the number of InitializeLibrary and ShutdownLibrary calls so that only the first InitializeLibrary and last ShutdownLibrary will act upon resources used. This may be configured to enable the client to operate in a way that will ensure accidental calls will not interrupt functions of the interface. The following code may be configured to trigger these functions:
  void InitializeLibrary(bufferMillisecondsPerChannel, callbackPeriod);
  void ShutdownLibrary( );

TABLE 6

Initialize/Library Function

| Parameter | Description |
|---|---|
| BufferMillisecondsPerChannel | Controls the size of the buffer used to hold voice data for each virtual channel. Should be larger than the callback period. |
| CallbackPeriod | Controls the frequency of callbacks. For example setting 1000 ms would imply one callback per second for each channel. |

Additionally, StartStreaming and StopStreaming functions may be utilized by the IP voice interface and may used to cause the interface to begin streaming data via the callback functions currently registered. These functions may also cause the warning and error callback functions to be called for the indicated context in the event that connection is lost. These functions may be represented by the following code:
  void StartStreaming (ContextSet contexts, AdapterSet adapters);
  void StopStreaming (ContextSet contexts);

TABLE 7

StartStreaming and StopStreaming Functions

| Parameter | Description |
|---|---|
| Contexts | Identifies the contexts (PWE3 stream of several virtual channels) to begin streaming on and reporting errors on. |

TABLE 7-continued

StartStreaming and StopStreaming Functions

| Parameter | Description |
|---|---|
| Adapters | Identifies the network adapters to be used to connect to the IPSI cards. |

Figure 7:
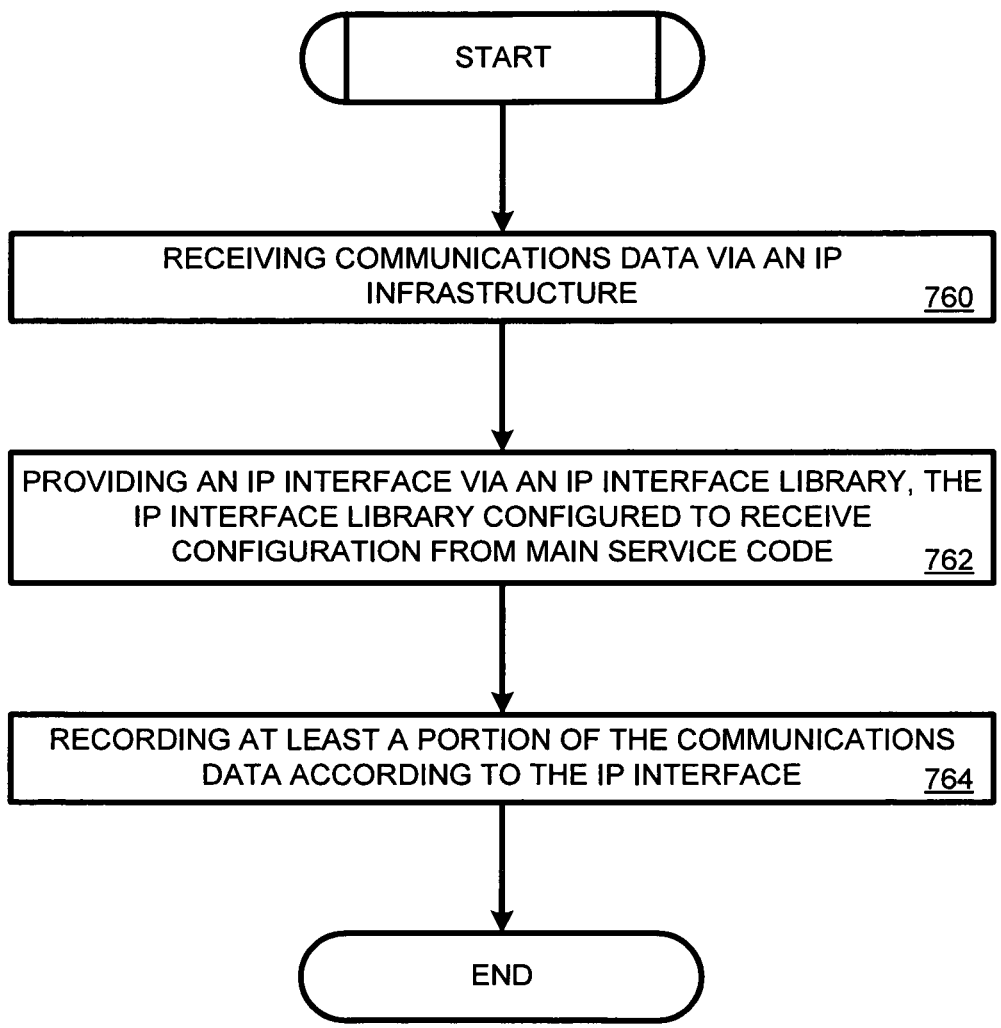
FIG. 7 is an exemplary embodiment of a process that may be utilized for recording communications data, such as in the customer center from FIG. 1.

FIG. 7 is an exemplary embodiment of a process that may be utilized for recording communications data, such as in the customer center 105 from FIG. 1. As illustrated in the non-limiting example of FIG. 7, a recording host can receive communications data via an IP infrastructure (block 760). The recording host can provide an IP interface via an IP interface library, the IP interface library configured to receive configuration data from the main service code (block 762). The recording host can record at least a portion of the communications data according to the IP interface (block 764).

FIG. 8 is a schematic diagram illustrating an embodiment of a computer for implementing an interface. Generally, in terms of hardware architecture, system 800 includes a processor 802, memory 804, and one or more input and/or output (I/O) devices interface(s) 806 that are communicatively coupled via a local interface 808. The local interface 806 can include, for example but not limited to, one or more buses or other wired or wireless connections. The local interface may have additional elements, which are omitted for simplicity, such as controllers, buffers (caches), drivers, repeaters, and receivers to enable communications. One should note that memory 804 may also include recording logic 812, which may be configured to provide an IP interface, as discussed above, and/or perform other actions described above. Similarly, the recording logic 812 may one or more separate components, as illustrated in recording host 732 from FIG. 6.

Further, the local interface may include address, control, and/or data connections to enable appropriate communications among the aforementioned components. The processor may be a hardware device for executing software, particularly software stored in memory.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory includes an operating system 710, as well as instructions for implementing an interface. Exemplary embodiments of each of which are described above.

It should be noted that embodiments of one or more of the systems described herein could be used to perform an aspect of speech analytics (i.e., the analysis of recorded speech or real-time speech), which can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can potentially improve collection effectiveness and reduce corporate liability and risk.

In this regard, various types of recording components can be used to facilitate speech analytics. Specifically, such recording components can perform one or more of various functions such as receiving, capturing, intercepting and tapping of data. This can involve the use of active and/or passive recording techniques, as well as the recording of voice and/or screen data.

It should be noted that speech analytics can be used in conjunction with such screen data (e.g., screen data captured from an agent's workstation/PC) for evaluation, scoring, analysis, adherence and compliance purposes, for example. Such integrated functionality can improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities.

Referring back to the collections example outlined above, by using emotion and concept detection, companies can identify which customers are attempting to mislead collectors into believing that they are going to pay. The earlier the company is aware of a problem account, the more recourse options they may have. Thus, the speech analytics of the present disclosure can function as an early warning system to reduce losses.

Additionally, included in this disclosure are embodiments of integrated workforce optimization platforms, as discussed in U.S. patent application Ser. No. 11/359,356, filed on Feb. 22, 2006, entitled "Systems and Methods for Workforce Optimization," U.S. patent application Ser. No. 11/540,185, filed on Sep. 29, 2006, entitled "Systems and Methods for facilitating Contact Center Coaching," and U.S. Patent Application No. 60/909,060, filed on Mar. 30, 2007, entitled "Systems and Methods for Integrating Customer Center Operations Based on Customer Input," all of which are hereby incorporated by reference in their entireties. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; (5) Analytics—deliver insights from customer interactions to drive business performance; (6) Coaching—feedback to promote efficient performance; and/or (7) Survey—receipt and review of customer feedback and analysis of interactions from customer perspective. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience. A survey can be provided in order to obtain customer feedback regarding a customer's experience with the customer center.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiments without departing Therefore, at least the following is claimed:

1. A method for providing an interface, comprising:
receiving communications data associated with a communications session in a customer center, the communications session facilitated in an Internet Protocol environment; and
providing the interface to a recording system for facilitating recording of voice packets and status information and one of error and warning information associated with the communications session, the interface being facilitated in an Internet Protocol (IP) format; wherein the recording system receives various types of external contact center events from multiple servers, further wherein the recording system enables continued use of the multiple servers by receiving the various types of external contact center events and determines whether to record communications data based on the received events;
utilizing a failover recorder in response to a determination that a primary recorder has failed, wherein the primary recorder and the failover recorder are configured to receive the communications data;
determining whether the primary recorder has failed;
providing, via the interface, an indication that the primary recorder has failed;
utilizing Voice Operated Exchange (VOX) detect to remove silent periods; and
providing a time division multiplexing (TDM) infrastructure such that the communications data may be TDM based,
wherein the interface is configured to provide event callback functionality to the customer center, the event callback functionality being called by an application program interface (API) to provide event types to the interface for recording.

2. The method of claim 1, further comprising recording at least a portion of the communications data according to the interface.

3. The method of claim 1, wherein the event callback functionality is configured to facilitate the delivery of voice packets, error, warning and status information for a recording.

4. The method of claim 1, wherein the interface is configured to determine a channel from which the communications data is received.

5. The method of claim 1, wherein the interface include initialization and termination functionality, the initialization and termination functionality configured to setup at least one recording resource during use.

6. The method of claim 1, wherein the failover recorder is unutilized prior to the determination that the primary recorder has failed.

7. The method of claim 1, wherein the failover recorder is configured for normal operation prior to the determination that the primary recorder has failed.

8. The method of claim 1, further comprising a plurality of failover recorders.

9. The method of claim 1, wherein the interface is configured to operate with at least one of the following: Pseudo wire Emulation Edge to Edge (PWE3) protocol, Session Initiation Protocol (SIP), and Real-Time Protocol (RTP).

10. The method of claim 1, wherein the event types include at least one of a buffer status, a connection warning, a connection error, and a overflow error.

11. A system for providing an interface, comprising:
an interface card configured to receive communications data associated with a communications session, the communications session facilitated in an Internet Protocol environment;
an IP interface library configured to provide an Internet Protocol (IP) voice interface for facilitating recording of voice packets and status information and one of error and warning information associated with the communications session, the interface being facilitated in an Internet Protocol format;
a recording system configured to record at least a portion of the communications data according to the interface; wherein the recording system receives various types of external contact center events from multiple servers, further wherein the recording system enables continued use of the multiple servers by receiving the various types of external contact center events and determines whether to record communications data based on the received events; and
a time division multiplexing (TDM) infrastructure, wherein the TDM infrastructure IS configured such that the system may record TDM based data,
wherein the communications data is received at a first recorder and a second recorder, the second recorder configured to provide failover recording protection, wherein a determination is made whether the first recorder has failed, wherein an indication that the first recorder has failed is received over the IP interface, wherein the IP voice interface is configured to provide initialization and termination functionality, the event callback functionality being called by an application program interface (API) to provide event types to the interface for recording, and wherein Voice Operated Exchange (VOX) detection is used to remove silent periods.

12. The system of claim 11, wherein the initialization and termination functionality is configured to initialize without interrupting the communications session.

13. The system of claim 11, wherein the interface is further configured to provide a callback function.

14. The system of claim 11, wherein the interface is configured to determine a channel from which the communications data is received.

15. The system of claim 11, further comprising:
a determining component configured to determine whether the first recorder has failed; and
second IP interface library configured to provide, via the interface, an indication that the first recorder has failed.

16. A system for providing an interface, comprising:
a network interface card configured to receive communications data associated with a communication session;
an Internet Protocol (IP) interface library coupled to the network interface card, the IP interface library configured to provide an IP interface for recording voice packets and status information and one of error and warning information contained in the communications data, the IP interface library being called by an application program interface (API) to provide event types to the interface for recording; wherein the system receives various types of external contact center events from multiple servers, further wherein the system enables continued use of the multiple servers by receiving the various types of external contact center events and determining whether to record communications data based on the received events, wherein the communications data is received at a first recorder and a second recorder from the IP interface, the second recorder configured to provide failover recording protection, wherein a determination is made whether the first recorder has failed, wherein an indication that the first recorder has failed is received over the IP interface;
a time division multiplexing (TDM) infrastructure, wherein the TDM infrastructure IS configured such that the system may record TDM based data; and
a main service code coupled to the IP interface library, the main service code configured to provide configuration information to the IP interface library,
wherein Voice Operated Exchange (VOX) detection is used to remove silent periods.

17. The system of claim 16, wherein the main service code is further configured to generate a recorder configuration document.

18. The system of claim 16, further comprising recording logic configured to record at least a portion of the communications data.

19. The system of claim 16, wherein the communications data is received from a customer center.

20. The system of claim 16, wherein the communications data is received via an IP infrastructure.

21. The system of claim 16, wherein the system is embodied in a non-transitory computer readable medium.

* * * * *